Dec. 14, 1943.  C. H. LINDSAY  2,336,942
AIRCRAFT FIRE EXTINGUISHING SYSTEM
Filed Sept. 16, 1942  2 Sheets-Sheet 1
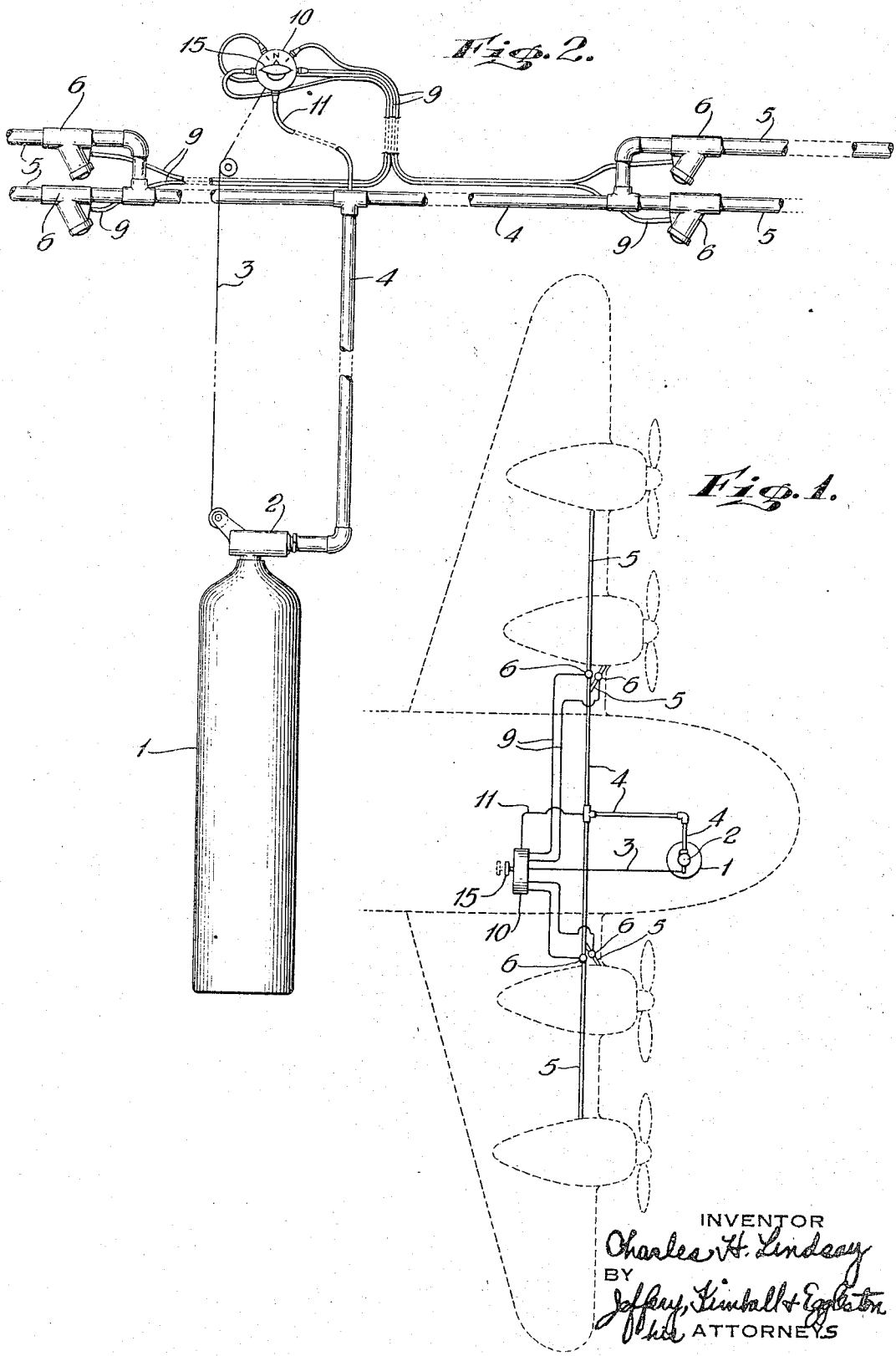
INVENTOR
Charles H. Lindsay
BY
Jeffery, Kimball & Eggleston
his ATTORNEYS Dec. 14, 1943.  C. H. LINDSAY  2,336,942
AIRCRAFT FIRE EXTINGUISHING SYSTEM
Filed Sept. 16, 1942  2 Sheets-Sheet 2
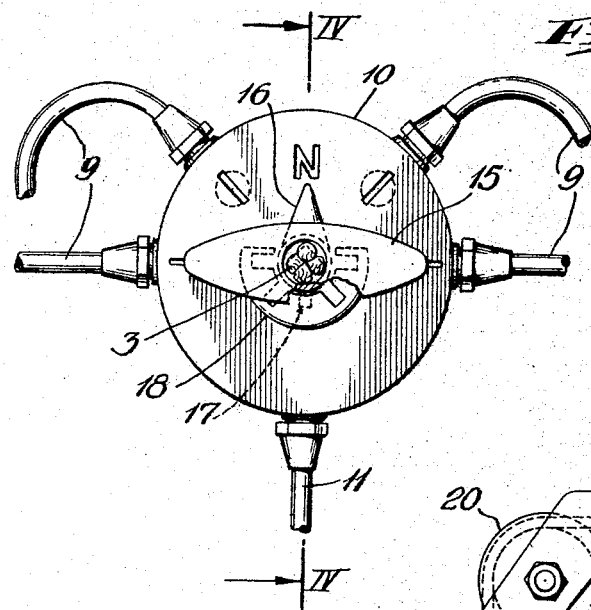
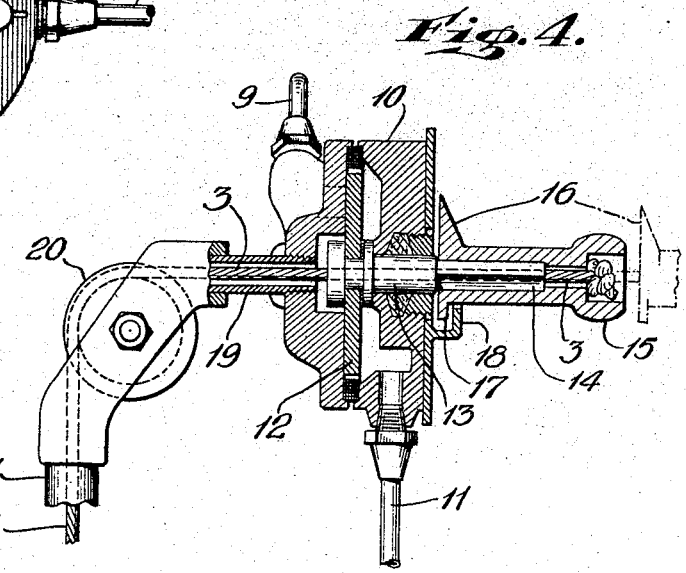
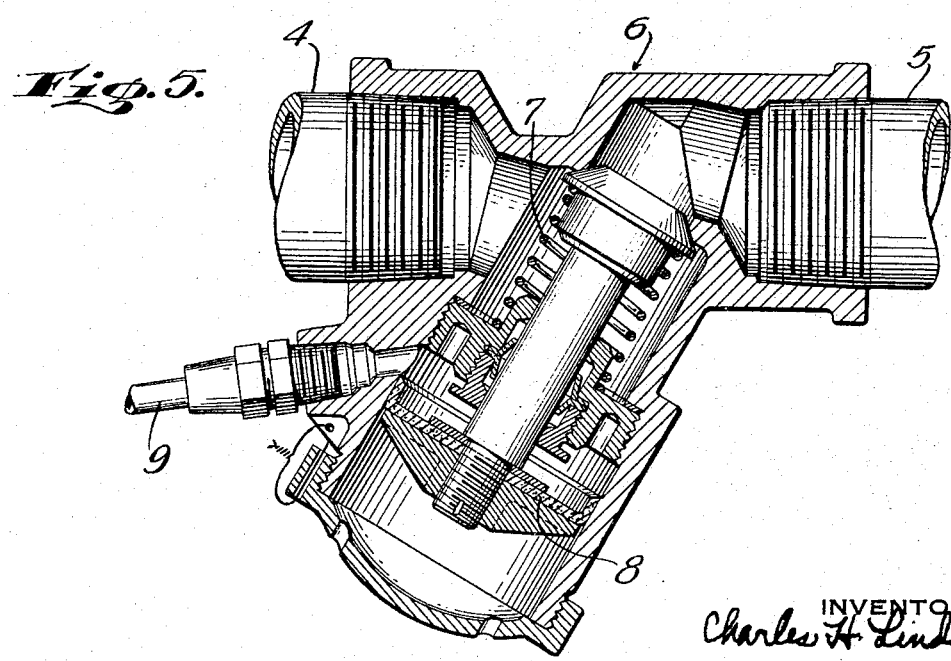
INVENTOR
Charles H. Lindsay
BY
Jeffery, Kimball & Eggleston
ATTORNEYS Patented Dec. 14, 1943

2,336,942

UNITED STATES PATENT OFFICE 2,336,942

AIRCRAFT FIRE EXTINGUISHING SYSTEM

Charles H. Lindsay, Elmira, N. Y., assignor to American-La France-Foamite Corporation, Elmira, N. Y., a corporation of New York Application September 16, 1942, Serial No. 458,489

2 Claims. (Cl. 169—2)

The invention is an improved aircraft fire extinguishing system, employing carbon dioxide or like gas under high pressure as the extinguishing medium, its objects being primarily to reduce the complication and labor required for installing such systems in the aircraft, as well as to minimize the weight of the system when installed, both of which are objects of prime importance, especially in war time.

In such systems the dioxide supply comprises one or a battery of flasks usually located in the lower part of the fuselage and, if a battery, they are manifolded together so as to act as a single flask, each having an operating head and one at least being of the type designed for actuation from a remote point to release the gas therefrom. Such source of dioxide is connected by piping to a selector valve at the pilot's station and through the latter to each of the several engine nacelles, or engine compartments therein, or to other fire hazards, so that the discharge of gas can be directed to any one of them, according to the pilot's setting of such selector valve made at the time of the fire. Inasmuch as the dioxide pressure is normally above 800 lbs. per square inch and the piping must therefore be of the high-pressure kind, carefully set up from flask to selector, and thence by branches to the several engines, the installation of these systems requires much expert labor and a considerable total length of large-section, high pressure pipe with many joints and elbows; also it is often difficult to find the necessary space at the pilot's station for the selector valve of the size required on account of the multitude of other connections also converging at that point.

According to this invention the gas delivery to the engine compartments is made through a system of discharge piping of the requisite diameter running in the shortest possible course from the source to each compartment to which gas is to be delivered as directly as the internal wing structure of the craft will permit, so that the total length (weight) of this high-pressure and large-section piping is a minimum, while the control of this system is effected by an auxiliary connected system of flexible and smaller diameter lines which alone are required to extend to the selector at the pilot's station. This auxiliary system is constituted of relatively slender, flexible tubing so slender as to be regarded as hollow wire though perfectly capable of sustaining the pressures involved. Tubing of such dimension is of very low weight per unit length, usually of aluminum, so that the total length used is not of such great consequence and it can therefore be trained or laced through and between structural members and through spaces in the wings and body which would be inaccessible for installing ordinary jointed-piping. It can therefore be extended up to the pilot's station with practically the same facility as electric wiring, being at the same time located out of the way and thus least exposed to injury. By such division of the system into related delivery and control sections or systems of the kind indicated, the new equipment involves least weight and, more important, can be installed in the plane in much less time.

The principle of the present invention, as will presently appear, can be variously incorporated in aircraft and is shown in its form at present preferred, in the accompanying drawings wherein Fig. 1 is a diagram layout of the system applied to a 4-engine aircraft;

Fig. 2, a structural portion thereof;

Fig. 3, a face view of the selector device;

Fig. 4, a section thereof; and

Fig. 5, a section of one of the stop valves.

While the proportions in Fig. 1 are exaggerated, it will be understood that the single flask 1 represents the whole source of dioxide, being located between decks or in the lower part of the fuselage or wherever most convenient. The extinguishing gas is normally confined in the flask by its operating head 2 which can be understood to contain a sealing disc and a piercer therefor, not illustrated, but adapted to be remotely actuated by means of some appropriate operating connection, electric, hydraulic or mechanical, a pull-cable 3 being indicated in the present case, running up to the pilot's station.

When the flask head or piercer is actuated the released gas flows directly into the delivery piping system 4 which, as stated, runs in the shortest convenient course from the flask directly through the wing structures with branch connections 5 to each engine compartment. This piping is made up of large-section, high-pressure pipe, about one inch diameter, including the branches, thus to carry the full volume of the discharge when the gas is released into it.

Each branch 5 includes a stop valve 6 located at the end of the branch nearest to the flask and therefore most remote from its engine compartment, and each such valve (see Fig. 5) is normally closed by its spring 7, closure being in the direction of flow. The system is thus normally at atmospheric pressure and closed, so that in the event of a premature or accidental rupture of the sealing disc from any cause, the gas will be confined in the piping and no gas can possibly reach an engine which, if that should happen, would be stalled.

Any one of these valves can be selected for opening by the pilot, for which purpose the stem of each valve is provided with a piston 8 working in an appropriate cylinder incorporated in the valve structure, and each cylinder is connected by a line of the tubing or hollow wire 9 above referred to with the selector valve 10, which latter is located at a point on the craft most convenient to the operator and herein called the pilot's station. The drawings do not attempt to illustrate the devious courses which these flexible tubes must follow, in an actual plane, in order to reach the pilot's station; in general the control system resembles electric wiring.

The control system is further connected to the delivery system by a line of tubing 11 which is tapped into the larger section piping 4 at the nearest or most convenient point in the fuselage. The purpose of this connection is to admit gas pressure to the selector valve at the appropriate time, for transmission thereby, through one or the other of the tubes 9, to open the respective stop valve and according to the setting which has been given to the valve by the pilot.

The selector valve itself can be variously made; in the present case it comprises a flat valve disc 12 normally covering and closing the several ports in the valve body to which the several tubes 9 are connected. It is adapted to be rotated to uncover any one of these ports thus to admit fluid pressure thereto from the tube 11. For this purpose it is carried fast on a tubular arbor 13 provided with a squared stem 14 with which the handle 15 is normally engaged. By the use of this handle the valve disc can be set to any desired station indicated by its pointer 16 in connection with a related index on the face plate of the valve corresponding to the engine compartments or fire hazards.

When properly set by the handle 15 the system is in readiness to deliver gas to the station selected but no gas is delivered until the operating head of the flask has been actuated. For this purpose the turn handle 15 is also connected to the operating connection 3 above referred to, so that by merely pulling this handle off the stem 14 the sealing disc becomes punctured or opened, thus allowing the gas to expand into the two systems. Thereupon some of the released gas flowing through the tube 11 to the selector valve continues on to that particular stop valve, which was selected by the pilot, and acting on the piston 8 of that valve opens it. The opening occurs against the combined pressures of the spring 7, and the gas already in the delivery piping 4, and the piston 8 is made of adequate area for opening the stop valve against this resistance. Thereupon the gas flows to the compartment on fire.

The pull handle 15 is interlocked with the valve casing, or its escutcheon plate, so that it cannot be pulled off the valve stem, thus to release the gas, until it has first been properly set to register the valve disc with one of the tubes 9, i. e. one of the fire hazards. This is represented by a lug 17 cast on the handle and a corresponding notched flange 18 applied to or formed on the valve body, the lug and notches being positionally correlated to produce the effect just stated, thus requiring a proper station selection to be made before the gas flow can be started. In the normal or non-use position of the selector device, the pointer registering at the normal setting, the valve disc 12 overlies and closes all of the flexible tube parts leading to the stop valves and in this position the handle cannot be pulled on account of the interlock nor can a premature gas release become effective on any of the stop valves; in such event and as already indicated, the gas is confined in the pipe and tube systems without possibility of its entry to any engine compartment. For additional security in this respect the porting of the selector valve is so designed that any pressure therein acts in the direction to press the valve disc against its seat.

When a cable is used for the flask-actuating means it most conveniently extends from the handle through the tubular valve stem 13 and through a tubular bracket 19 screwed into the valve, and over a guide-sheave 20 carried on the bracket. From thence it is trained over such other sheaves as may be necessary for connecting it to the flask head, as will be understood, and it is customarily also enclosed between sheaves in a conduit 21 so that it will not be accidentally pulled.

I claim:

1. In an airplane, the combination with a plurality of compartments on the wings thereof to which gas is to be delivered, of a gas delivery pipe system extended through the wing structure having branches respectively to such compartments and normally closed piston-operated stop valves respectively located in and normally closing each of such branches, said system comprising relatively large pipe sections adequate for the full discharge, a control system including pressure-transmitting flexible tube lines of relatively small section extending from said valves and connected to a selector valve, said selector valve being located at the pilot's station and including a handle adapted to be manually rotated and pulled axially and a valve member operated by the rotation of such handle to be registered with any one of such flexible tube lines, a flask of compressed gas remote from said station, a normally closed operating-head therefor connecting the flask to said delivery system, a gas connection from said delivery system to said selector valve, and an operating connection extending from said flask head to said handle arranged to be operated by the pulling of such handle, thereby substantially simultaneously opening said operating head and one of said stop valves to admit gas into said delivery system and from the latter to the selected compartment.

2. In an aircraft, the combination of the engine compartments and a gas delivery pipe system extended through the wing structure with branches therein respectively leading to such compartments and piston-operated stop valves respectively located in and normally closing each of such branches, said system comprising pipe of relatively large section adequate for rapid high-pressure gas discharge therethrough, a control system including pressure transmitting tube lines of relatively small section capable of easy flexure extending from said stop valves to the pilot's station, a manual device including a selector valve located at such station connected with said tube lines of smaller section and adapted for manipulation to select for action any one of such lines and the piston of the stop valve appurtenant thereto, a flask of compressed gas having a normally closed operating head connected to said delivery pipe system and also connected to said selector valve, an operating handle for said device and an operating connection extending from said handle to said flask-operating head adapted for actuating the latter to release gas into both said systems for thereby actuating the selected stop valve and admitting gas from said flask into the delivery system and through said stop valve to a selected compartment.

CHARLES H. LINDSAY.